United States Patent
Fugitt

[11] 3,721,500
[45] March 20, 1973

[54] INSTRUMENT FOR MEASURING THE DEPOLARIZATION OF BACKSCATTERED LIGHT

[75] Inventor: Ronald Bruce Fugitt, San Diego, Calif.

[73] Assignee: The United States of America as represented by the Secretary of the Navy

[22] Filed: Aug. 6, 1971

[21] Appl. No.: 169,715

[52] U.S. Cl. ..............356/118, 356/114, 356/104, 356/210, 250/225
[51] Int. Cl. ............................................G01n 21/40
[58] Field of Search ......250/225; 356/114, 118, 115, 356/116, 103, 104, 210

[56] References Cited

UNITED STATES PATENTS

| | | |
|---|---|---|
| 3,600,094 | 3/1971 | Liskowitz..............................356/114 |
| 3,612,689 | 10/1971 | Liskowitz..............................356/114 |
| 3,653,767 | 4/1972 | Liskowitz..............................356/114 |

Primary Examiner—Ronald L. Wibert
Assistant Examiner—Paul K. Godwin
Attorney—Richard S. Sciascia et al.

[57] ABSTRACT

An instrument capable of obtaining information on the polarization properties of ocean waters. Operation of the instrument is as follows: Light from a He-Ne laser passes through a rotating beam chopper, a rotating linear polarizer, and a light guide and an aperture (to block spurious reflections) into the scattering medium, generally seawater. A portion of the backscattered light is intercepted by an analyzer-detector module, and after amplification the detector output is displayed on an oscilloscope. The beam is chopped at 20 times the rotational frequency of the polarizer. This provides an a-c backscatter signal which is independent of detector drift and changes in background illumination, if detector saturation is avoided. The rotating polarizer produces a modulation of the signal at twice the rotational frequency. The maximum signal $P_{max}$ occurs when the polarizer and analyzer are in the "aligned" position, and the minimum signal $P_{min}$ occurs when they are "crossed." The degree of polarization is given by $$\psi = P_{max} - P_{min}/P_{max} + P_{min}$$

A quarter-wave plate which can be flipped into or out of the path of the light beam permits use of the instrument using circular polarization techniques.

5 Claims, 5 Drawing Figures

CIRCULAR POLARIZATION TECHNIQUE FOR ELIMINATION OF BACKSCATTER.

TAP WATER
$\psi \approx 0.92$

TAP WATER WITH SUSPENDED
NAUGATEX PARTICLES $\psi \approx 0.70$

FIG. 3. POLARIZATION OF BACKSCATTERED LIGHT.

INVENTOR.
RONALD BRUCE HUGITT,
BY ERVIN F. JOHNSTON,
ATTORNEY.
JOHN STAN
AGENT

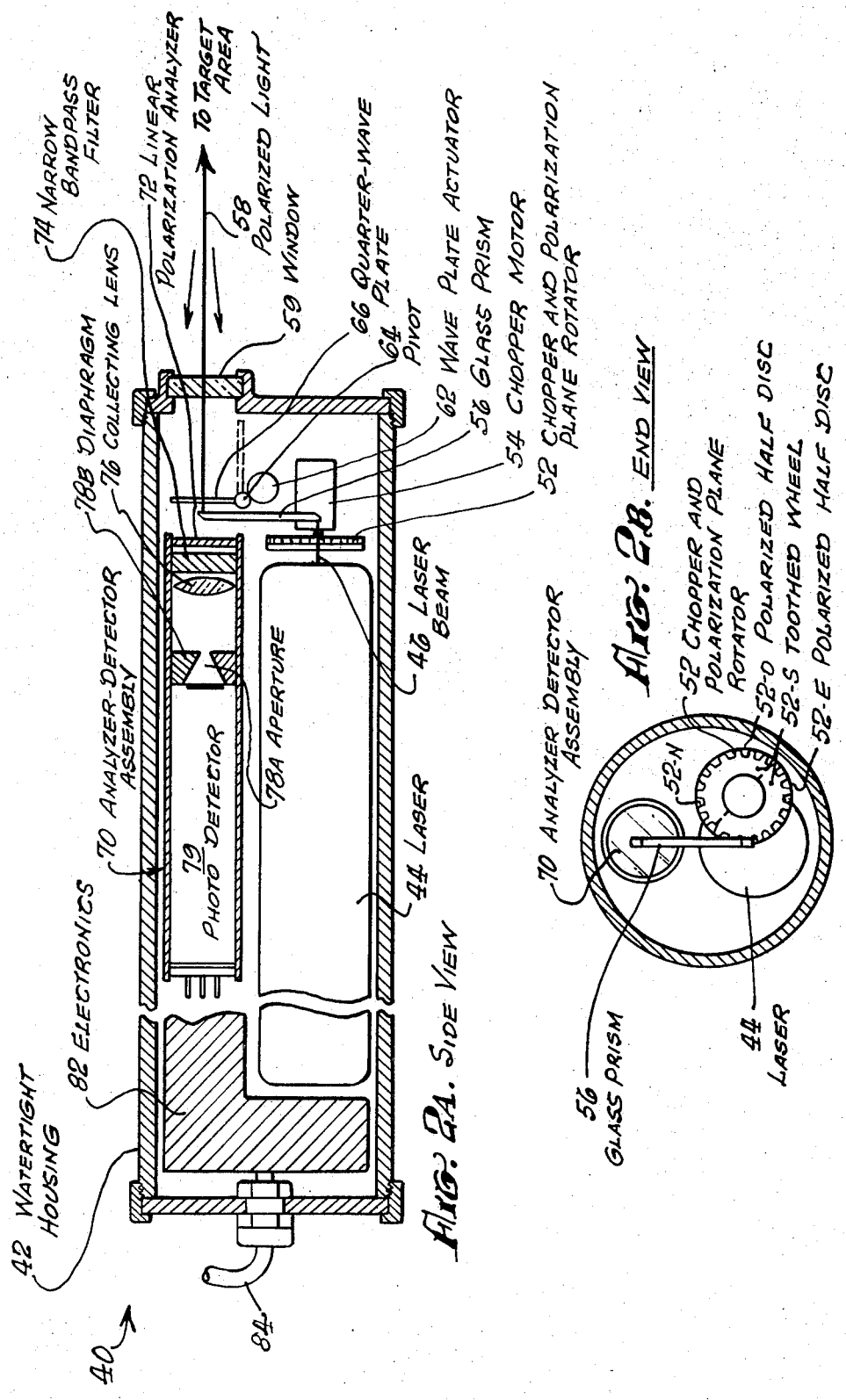

INSTRUMENT FOR MEASURING THE DEPOLARIZATION OF BACKSCATTERED LIGHT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

When artificial illumination is used underwater, visibility is often impaired due to the presence of backscattered light. It has been demonstrated that in some cases, circular polarization techniques can be used to improve target visibility and increase viewing ranges. When right circularly polarized (RCP) illumination is used, the back-scattered light is partially left circularly polarized (LCP), and a portion can be blocked by placing a right circular polarization analyzer in front of the receiver. The returning target light, however, is generally depolarized, and up to 50 percent will be transmitted by the analyzer. Linear polarizers and analyzers may also be used to reduce backscatter, but the polarizer and analyzer must be maintained in the "-crossed" orientation. With circular polarization, the source and receiver may be allowed to rotate independently.

Two problems which prevent the immediate adoption of polarization techniques for underwater viewing are: (a) The power loss due to absorption by the polarizer and analyzer (approximately 86 percent) is objectionable for use on energy-limited underwater vehicles. (b) Information is not available on the depolarization of light due to scattering by suspended particles and organisms in ocean waters. Recent work has partially overcome the first problem, but in-situ depolarization measurements are needed to predict visibility improvements for actual ocean waters. An effort to solve the second problem culminated in the invention of the instrument herein described.

The instrument of this invention provides answers to the following questions: (1) To what degree is backscattered light depolarized for different ocean and lake waters at various depths? (2) Does depolarization have a correlation with backscattered power? (3) Does it vary with the type of polarization (linear or circular)? (4) What is the maximum viewing range increase that could be obtained in various waters by using polarization techniques?

The prior art methods for determining the effectiveness of polarization techniques required the use of bulky equipment, such as cameras, lights, targets, and a rigid test facility. Such tests had to be performed at night, and were valid only for the particular water conditions at the test site, and for the test geometry used. To perform enough ocean tests with such equipment to provide a basis for future development would be very costly and time consuming.

SUMMARY OF THE INVENTION

The instrument of this invention will satisfy the preceding requirements. It has a depth capability of approximately 100 meters, and provides real-time measurements of the polarization characteristics of backscattered light. The instrument housing is cylindrical, approximately 4 inches in diameter, and 24 inches in length.

Operation in the linear polarization mode with the quarter-wave plate out of the optical path, is as follows: Polarized light of 6328 A wavelength emerges from the laser in a highly collimated beam, passes through a combination beam chopper and polarization rotator, through a prism used as a light guide, and out into the scattering medium. Light that is scattered from this beam through large angles (backscatter) returns to the analyzer-detector assembly, and an electrical signal is obtained. During one half-cycle of the chopper wheel, the analyzer is in the "crossed" position relative to the outgoing beam (maximum backscatter rejection) and during the next half-cycle it is in the "parallel" position (minimum backscatter rejection). The change between crossed and parallel conditions is accomplished by using birefringent half-wave material on one half of the chopper wheel. This material produces a 90° rotation in the plane of polarization of the outgoing beam when it is in the optical path.

When the quarter-wave plate is in place, the linearly polarized beam is converted to one which is circularly polarized. As the chopper wheel rotates, the outgoing beam alternates between right and left hand circular polarization states. Since the circular polarization analyzer (consisting of the quarter-wave plate and the linear polarization analyzer) is fixed, during one half-cycle it is of the same handedness as the outgoing beam (maximum backscatter rejection) and during the next it is of opposite handedness (minimum backscatter rejection).

From these maximum and minimum power measurements, the degree of polarization $\psi$ of the backscattered light is given by $$\psi = P_{max} - P_{min}/P_{max} + P_{min}, \quad (1)$$

the degree of depolarization is $1-\psi$, and the total (relative) power incident on the analyzer is $$P = P_{max} + P_{min}. \quad (2)$$

STATEMENT OF THE OBJECTS OF THE INVENTION

An object of the invention is to provide an instrument capable of measuring the polarization properties of the ocean rapidly and continuously as a function of depth.

Another object of the invention is to provide an instrument which is compact, easily transportable, and requires no rigid test facility.

Yet another object of the invention is to provide an instrument by which the polarization characteristics of various targets can be investigated.

Other objects, advantages and novel features of the invention will become apparent from the following detailed description of the invention when considered in conjunction with the accompanying drawings wherein:

BRIEF DESCRIPTION OF THE DRAWINGS

FIGS. 2a and 2b are a pair of cross-sectional views of the instrument for depolarization measurements of this invention.

DESCRIPTION OF THE PREFERRED EMBODIMENTS

Discussing now the background information in more detail, in order to better comprehend the invention, one of the problems encountered in underwater viewing is the loss of contrast due to the presence of backscattered light. It has been shown that circular polarization discrimination techniques are effective in some cases as a means of improving target visibility or extending the viewing range.

Figure 1:
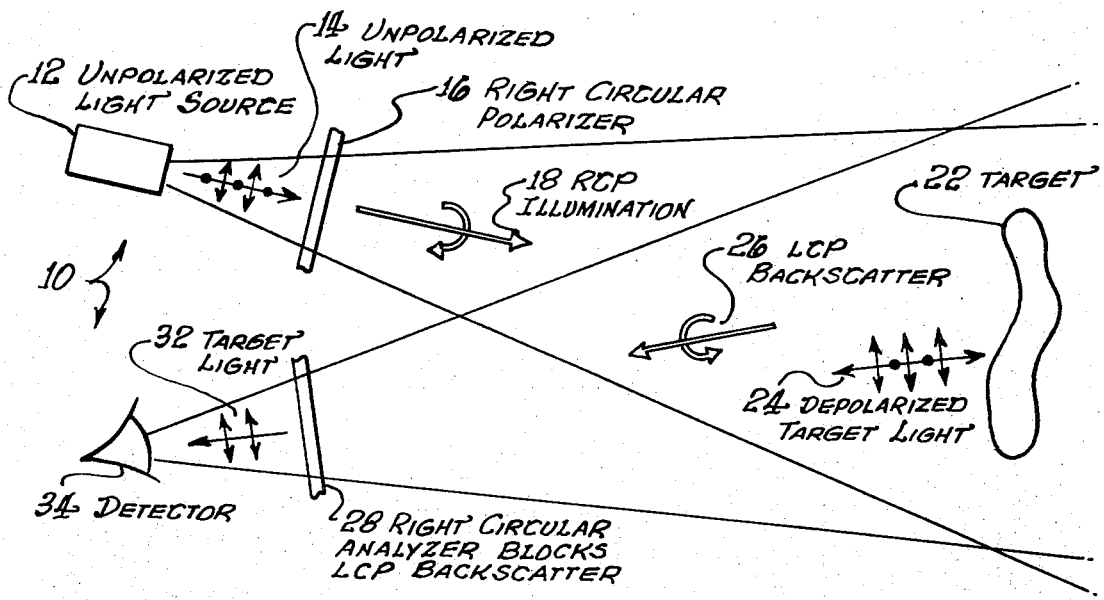
FIG. 1 is a diagram of a circular polarization technique for the elimination of backscatter, showing the general parameters involved.

FIG. 1 illustrates the main components of an extended range or contrast improvement system 10 of the prior art which utilizes circularly polarized light. A source of unpolarized light 12 propagates a beam of unpolarized light 14 through a right circular polarizer 16, whereupon it becomes right circularly polarized (RCP) light 18. The RCP light 18, after impinging upon the target 22, becomes depolarized target light 24. There is also a considerable amount of left circularly polarized (LCP) backscattered light 26 produced.

In many cases of underwater viewing, much of the backscattered light 26 is due to single scattering by suspended particles and microorganisms in the water. If RCP light 18 is used for illumination, much of the backscattered light 26 is LCP light, and can thus be blocked with a polarization analyzer, right circular analyzer 28. The light 24 returning from most underwater targets 22 is unpolarized, however, and a portion of this target light is transmitted by the analyzer 28, to become polarized light 32 when it enters the detector 34.

Referring now to FIG. 2, this figure shows an instrument 40 for measuring the depolarization of backscattered light, comprising a watertight housing, 42, also serving as a support for the various components of the instrument. Means for producing a beam 46 of collimated, polarized light, such as a laser 44, are included. Means for chopping, or periodically interrupting, the beam of light are also included. A polarizing plate 52 is inserted in the path of the beam of polarized light 46 when the light is not interrupted.

The chopping has the object of discriminating against background noise in the water. It does this by converting a direct signal into a chopped direct signal, which effectively is an a-c signal. This eliminates the problem of linearity of the detector, the photodetector 79. The effect of chopping the signal is that an a-c signal is measured, so that if the direct-current operating point of the phototube used as a photodetector 79 drifts, it does not unduly affect the mode of operation of the instrument 40. Another advantage of using a chopped signal is that is permits synchronization of the output of the photodetector 79, so that a fixed pattern is obtained on the oscilloscope. In the embodiment 40 shown in FIG. 2, the means for periodically interrupting the beam of light and the polarizing plate are combined, and comprise an opaque toothed wheel, or rotator 52-S, with a polarizing material, 52-0 or 52-E, at the open teeth 52-N of the wheel, the plane of polarization of the material being oriented with respect to a diameter of the wheel. By combining a polarization plane rotator and beam chopper in one unit 52 only one motor 54 is required, and light level variations due to polarization changes and beam chopping are synchronized. This allows the detector output, after amplification, to be easily measured with an oscilloscope. In a specific embodiment of the instrument 40, the plane of polarization of the polarizing material at the teeth of one half of the wheel 52-0 is oriented at right angles to the plane of polarization of the material at the teeth of the other half of the wheel 52-E. The polarization axis of one-half rotation of the wheel or rotator 52 remains the same, and then changes by 90° for the next half revolution. As indicated by the dotted line, the right-angled orientation could be effected by attaching two half-discs, 52-E and 52-0, of mutually perpendicularly polarizing material to a wheel 52-S of steel or other opaque material.

An embodiment similar to the embodiment 40 of FIG. 2 could be made having only two broad slots 52-N, or openings, in the periphery of the rotator 52, rather than the 20 or so actually used. However, with this type of implementation, the pattern on an oscilloscope would have a broad envelope, and the minimum and maximum would not be readily distinguishable.

A light guide, in the form of a narrow glass prism 56, channels the beam of varying polarized light 46 from one end, the lower end, and permits it to exit through the other, upper, end. A window 59, at one end of the housing 42, permits light 58 leaving the light guide 56 to illuminate the target area and be reflected back into the instrument 40. A quarter-wave plate 66 is capable of alternately being interposed in and out of the path between the window 59 and the light guide 56, and therefore in and out of the path of the light beam 58 transmitted to the target area and reflected back to the instrument 40.

The quarter-wave plate 66 flips up or down into one of two orthogonal positions. When the plate 66 is down, shown by the dotted position, then the photodetector 79 detects linear polarization and shows how well linearly polarized light is depolarized when it is scattered.

When the quarter-wave plate 66 is flipped up, as shown by the full line, then the linearly polarized light is converted into circularly polarized light, an it is circularly polarized light which is scattered back from the target area. Once again, as it goes through the quarter-wave plate 66, it is converted back to linearly polarized light. It can therefore be analyzed with the linear polarization analyzer 72.

Summarizing, when the quarter-wave plate 66 is flipped down, the photodetector 79 detects linearly polarized light; when the plate is flipped up, the photodetector detects circularly polarized light. Now, theoretically there should be no difference in the amount of detected light in either case, since circularly polarized light consists of two orthogonal linear components, which are 90° out of phase with respect to each other, so that if linearly polarized light is depolarized by this process, circularly polarized light should be depolarized by the same amount.

The reflected signal entering the instrument 40 is processed by an analyzer-detector assembly 70 comprising a linear polarization analyzer 72, so disposed as to intercept the light returning back through the window 59. A light collector includes a narrow-bandpass filter 74, collecting lens 76, and diaphragm 78P having an aperture 78A, for filtering and focusing the analyzed reflected light. A photodetector 79 measures the intensity of the focused reflected light, thereby enabling a comparison to be made of the intensity of the reflected or back-scattered light when the quarter-wave plate 66 is in the beam path and when it is not.

The small field of view (4° or 6° depending on aperture size) of the detector-analyzer assembly 70, and the narrow bandpass spectral filter 74 provide rejection of ambient light which is necessary to allow operation of the instrument 40 during daylight. The beam chopper 52 provides a 6kHz modulated signal which can be measured even in the presence of a fairly large (non-modulated) signal due to residual ambient light. By using either a multi-position beam attenuator (not shown) or by changing the input voltage to the photomultiplier tube 79, it should be possible to make measurements for a wide variety of backscatter conditions.

The use of the laser 44, chopper 52, narrow bandpass filter 74, and lens-aperture assembly, 76 and 78A, allow small signals to be detected in the presence of much ambient illumination and changes in the d-c output of the detector. This provides more accurate measurements and allows the invention to be used during daylight.

The light signal detected by photodetector 79 is amplified by the amplifying electronics 82. An output lead 84 from the amplifier 82 is available for connection to an indicating instrument, such as an oscilloscope.

On an oscilloscope, the pattern would appear as shown in FIG. 3, showing 10 cycles at the left of one polarization, and at the right, 10 cycles of the other polarization.

The rotating polarizer 52-0 and 52-E, produces a modulation of the signal at twice the rotational frequency. The maximum signal $P_{max}$ occurs when the polarizer 52-0 and 52-E, and analyzer 72 are in the "aligned" position, and the minimum signal $P_{min}$ occurs when they are "crossed." The degree of polarization is given by $$\psi = P_{max} - P_{min}/P_{max} + P_{min}$$

To obtain an oscilloscope sync signal, the polarizing material 52-0 or 52-E, was removed from one of the openings of the chopper wheel 52. This provides one high intensity backscatter pulse for each revolution of the wheel 52.

Figure 3A:
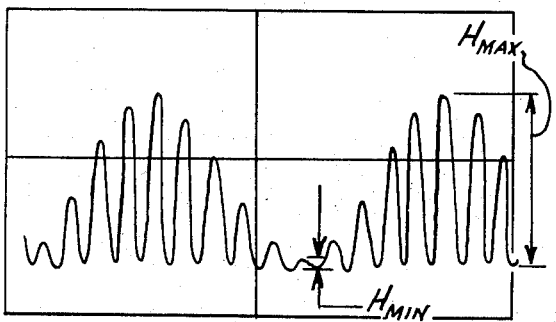
FIGS. 3a and 3b are a pair of scope patterns showing the polarization characteristics of backscattered light for two different liquids.
Figure 3B:
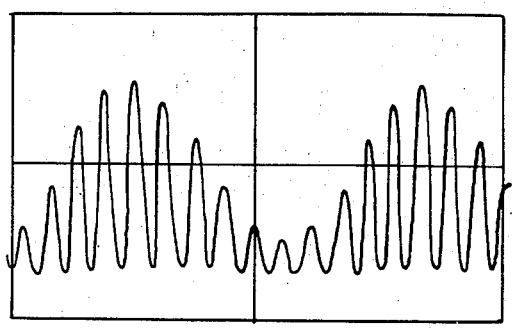

The oscilloscope traces, as may be seen from FIG. 3, show the detector output for two laboratory water samples. For relatively clear tap water, as shown in FIG. 3A, the backscatter was highly polarized ($\psi \cong 0.92$), but with a high concentration of suspended Naugatex particles (160 nm dia.), as shown in FIG. 3B, the degree of polarization $\psi$ was reduced to approximately 0.70.

In another type of embodiment, a first mirror was used with a hole in it in the middle, just large enough to pass the beam of light. After the light goes into the water, it becomes scattered by the water, reflected by the first mirror into another mirror, from whence the light would be reflected into the detector 79.

The prism 56 blocks the area where light enters, since it sticks up across the detector 79, whereas by using a mirror, only a small hole blocks the transmission of light. This would make an embodiment using mirrors more efficient than one using a prism 56. In addition, the mirrors do not scatter light into the detector 79. To reduce light scattering by the prism 56, the lateral surfaces of the prism 56 could be blackened.

The instrument 40 herein described can also be used above ground in a fog, to measure the depolarization characteristics of fog, since backscattering is also present in a fog.

Obviously many modifications and variations of the present invention are possible in the light of the above teachings. It is therefore to be understood that within the scope of the appended claims the invention may be practiced otherwise than as specifically described.

What is claimed is:

1. An instrument for measuring the depolarization of backscattered light, from a target located in a target area, comprising:

a housing, also serving as a support for the various components of the instrument;

means, disposed within the housing, for producing a beam of collimated, polarized light, the beam traversing a path;

means, disposed within the housing, for chopping, or periodically interrupting, the beam of light;

a polarizing plate, disposed within the housing, which is inserted in the path of the beam of polarized light when the light is not interrupted;

means for rotating the polarizing plate, to cause the polarization of the beam of polarized light which has traversed the polarizing plate to vary;

a light guide having two ends disposed within the housing, for channeling the beam of varying polarized light from one end and permitting it to exit through the other end;

a window, disposed at one end of the housing, which permits light leaving the light guide to illuminate the target area and be reflected back into the instrument;

a quarter-wave plate, disposed within the housing in a manner to be alternately interposed in and out of the light path between the window and the light guide; and an analyzer-detector assembly, disposed within the housing, comprising;

a linear polarization analyzer so disposed as to intercept the light reflected off the target and back through the window;

a light collector, including a narrow-bandpass filter, collecting lens, and diaphragm, for filtering and focusing the analyzed reflected light; and a photodetector, whose output comprises a detected voltage, for measuring the intensity of the focused reflected light, thereby enabling a comparison to be made of the intensity of the reflected or back-scattered light, and therefore of the detected voltage, when the quarter-wave plate is in the beam path and when it is not.

2. The instrument according to claim 1, wherein the means for producing a beam of collimated polarized light comprises a laser light source.

3. The instrument according to claim 2, wherein
the means for interrupting the beam of light and the polarizing plate comprise an opaque toothed wheel, or rotator, with openings between the teeth, and with a polarizing material at the openings between the teeth, the plane of polarization of the material being oriented with respect to a diameter of the wheel.

4. The instrument according to claim 3, wherein
the plane of polarization of the polarizing material at openings between the teeth of one half of the wheel is oriented at right angles to the plane of polarization of the material at the openings between the teeth of the other half of the wheel.

5. The instrument according to claim 4, further comprising:
electronic circuitry connected to the output of the photodetector, for amplifying the detected voltage.

* * * * *